(No Model.)

A. O. WOODBURY.
HEEL ATTACHMENT FOR PLOWS.

No. 486,416. Patented Nov. 15, 1892.

Witnesses
Wm. J. Schoenborn.
J. H. Siggers.

Inventor
Amasa O. Woodbury.
By his Attorneys,
C. A. Snow & Co.

UNITED STATES PATENT OFFICE.

AMASA O. WOODBURY, OF LAMPASAS, ASSIGNOR OF ONE-HALF TO JOHN O. DARBY, OF FLORENCE, TEXAS.

HEEL ATTACHMENT FOR PLOWS.

SPECIFICATION forming part of Letters Patent No. 486,416, dated November 15, 1892.

Application filed July 12, 1892. Serial No. 439,777. (No model.)

*To all whom it may concern:*

Be it known that I, AMASA O. WOODBURY, a citizen of the United States, residing at Lampasas, in the county of Lampasas and State of Texas, have invented a new and useful Heel Attachment for Plows, of which the following is a specification.

My invention relates to improvements in attachments for plows, and has special reference to that class of plow attachments known as "heel attachments" and designed to steady the sweep or double-shovel plow in its movements and prevent it from being deflected from a straight path by reason of obstacles with which it contacts.

The objects of my invention are to provide an attachment for this purpose that is thoroughly efficient and which is adjustable and yielding and may be applied to any ordinary sweep-stock.

Other objects and advantages of the invention will appear in the following description, and the novel features thereof will be particularly pointed out in the claims.

Figure 1:
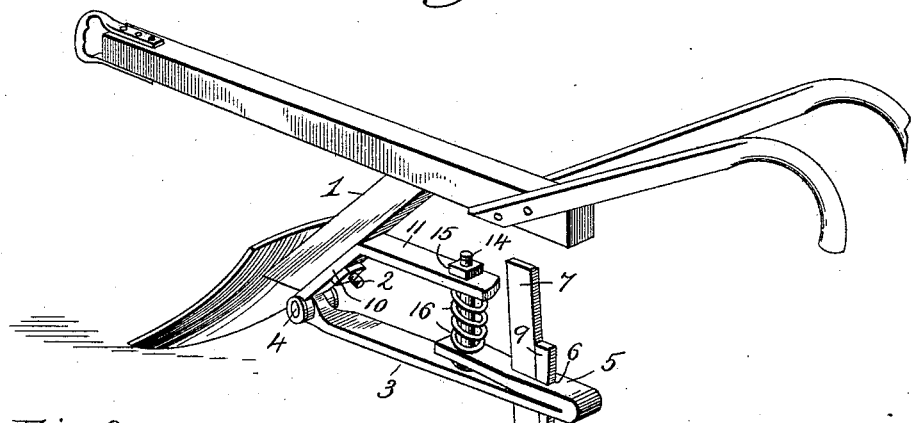
Figure 2:
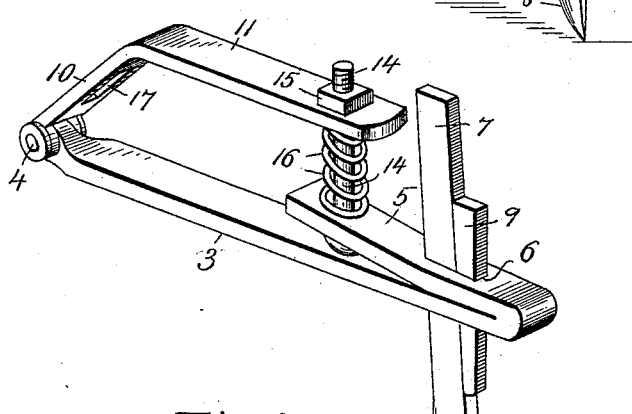
Figure 3:
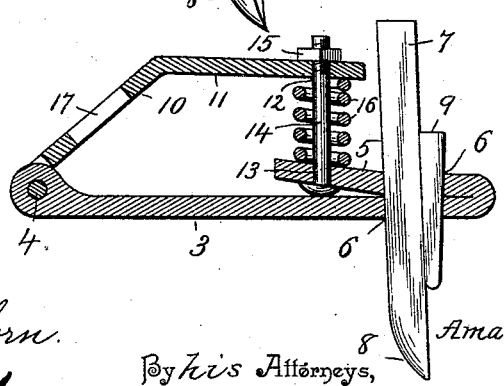

Referring to the drawings, Figure 1 is a rear perspective of a sweep-stock having a heel attachment constructed in accordance with my invention. Fig. 2 is a detail perspective of the attachment. Fig. 3 is a longitudinal section of the same.

Like numerals of reference indicate like parts in all the figures of the drawings.

1 designates the sweep stock or standard, to the lower end of which is secured the sweep by means of the usual heel-bolt 2.

The attachment consists of an upper and a lower member, the lower member being straight, as indicated at 3, and having its front extremity reduced and entered between the perforated bifurcated lower end of the upper bent member, the bifurcated and reduced ends being pivotally connected by means of a transverse pintle or bolt 4, whereby the two members have independent movement. The lower member after forming the straight portion 3 near its rear end is doubled or bent over upon itself, forming a slightly-diverging branch 5. Near the bend the two branches are provided with corresponding oblong openings 6, and located in said openings is a vertically-disposed blade 7, the lower end of which is rounded and reduced, as shown at 8, forming a point. This blade may be secured in position by various means; but in the present instance such is accomplished by means of a spike or wedge-shaped key 9, driven into the oblong opening between the rear edge of the same and that of the blade. The upper member comprises a front inclined portion 10 and a rear horizontal portion 11, the latter terminating above the diverging branch of the lower member. The rear end of the portion 11 has a bolt-opening 12, a corresponding opening 13 being formed near the front end of the diverging branch of the lower member. A bolt 14 is passed upwardly through the lower bolt-opening and at its upper end through the opening in the upper member, where it is provided with a nut 15. A coiled spring 16 encircles the bolt between the diverging branch and the upper member, and the tension of the spring may be increased or diminished by a proper manipulation of the nut upon the bolt in a manner that will be obvious. The inclined portion of the upper member, which I have indicated as 10, is provided with an oblong slot 17 and the same receives the heel-bolt of the sweep, by means of which the attachment is connected to the plow-stock. It will be seen that by such means as I have described the attachment may be raised or lowered, so as to run more or less deeply in the bottom of the furrow formed by the sweep.

By the use of my attachment the sweep runs steadily and I avoid any diverging from a straight path or course. The knife traveling at the bottom of the furrow prevents any undesired lateral movement of the plow, and in case it comes in contact with a stone the yielding connection or manner in which it is pressed to its work will permit it to ride lightly over the same, thus causing no damage to the knife or divergence to the course of the plow, and after such obstacle has been passed the spring will automatically return the knife to position.

Having described my invention, what I claim is—

1. The combination, with the sweep-stock, sweep, and heel-bolt, of the heel attachment comprising the upper and lower members hinged at their front ends, the upper member having an inclined front portion slotted to receive the bolt and the rear member carrying a knife, and a yielding spring adjustment between the rear ends of the members, substantially as specified.

2. The combination, with the sweep-stock, sweep, and bolt, of the heel attachment consisting of the lower horizontal member reduced at its front end and having its rear end bent upon itself and forming a diverging branch having an opening, a knife-receiving opening mounted in the rear end of the lower member, a vertical knife therein having its lower end beveled to form a cutting-edge, a wedge-shaped key for securing the knife in position, the upper member having the front inclined slotted portion, bifurcated at its lower end and pivotally connected to the front end of the lower member and at its rear end provided with a bolt-opening, a bolt passed upwardly through the perforation in the branch of the lower member and through the bolt-opening in the upper member, a nut on the upper end of the bolt, and a spring coiled upon the bolt between the two members, substantially as specified.

In testimony that I claim the foregoing as my own I have hereto affixed my signature in the presence of two witnesses.

AMASA O. WOODBURY.

Witnesses:
   D. J. MORRIS,
   J. W. STINNETT.